US005587989A

United States Patent [19]
Fujiwara et al.

[11] Patent Number: 5,587,989
[45] Date of Patent: Dec. 24, 1996

[54] CARTRIDGE CHANGING APPARATUS INCLUDING A PAIR OF BASE CARRIERS AND A PAIR OF SLIDE CARRIERS

[75] Inventors: Tatsunori Fujiwara; Yasuyuki Nakanishi; Koutarou Oka; Kei Shirahata; Shigehiro Itou, all of Hyogo, Japan

[73] Assignee: Mitsubishi Denki Kabushiki Kaisha, Tokyo, Japan

[21] Appl. No.: 423,751

[22] Filed: Apr. 18, 1995

[30] Foreign Application Priority Data

Oct. 3, 1994 [JP] Japan ................................. 6-238903

[51] Int. Cl.6 .............................. G11B 3/00; G11B 17/04; G11B 17/08
[52] U.S. Cl. ........................ 369/178; 369/191; 369/180
[58] Field of Search ...................................... 369/178, 180, 369/32, 34, 191, 192, 37, 39, 36; 360/97.03, 98.01

[56] References Cited

U.S. PATENT DOCUMENTS

| | | | |
|---|---|---|---|
| 5,046,059 | 9/1991 | Yoshida et al. | 369/36 |
| 5,267,225 | 11/1993 | Fukasawa et al. | 369/192 |
| 5,450,391 | 9/1995 | Pollard | 369/191 |

FOREIGN PATENT DOCUMENTS

| | | |
|---|---|---|
| 60-256976 | 12/1985 | Japan . |
| 6489066 | 4/1989 | Japan . |
| 3222141 | 10/1991 | Japan . |

Primary Examiner—Robert S. Tupper
Assistant Examiner—Adriana Giordana

[57]  ABSTRACT

A cartridge changing apparatus according to the present invention includes a plurality of holders, each holding a cartridge with a disc inserted therein, a pair of base carriers each having a gripping portion for gripping a pin fixed to one of the plurality of holders and each engaged with one of a pair of screw shafts so as to be able to move back and forth as the screw shafts are rotated, and a pair of slide carriers which are combined with the base carriers and can be moved on the screw shafts together with the base carriers, respectively. Cartridges are replaced by the back and forth movement of the pair of the carriers. Consequently, it is possible to simplify the carrier construction, eliminate the necessity of providing a plurality of gripping functions for one set of the carriers, thereby leading to reduction of required parts and further, make the carriers move vertically without interfering with anything at a position in which unloading is completed, thereby leading to reduction of operating time.

17 Claims, 14 Drawing Sheets

FIG. 22 a
FIG. 22 b
FIG. 22 c
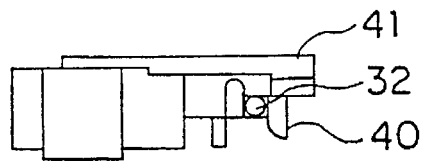
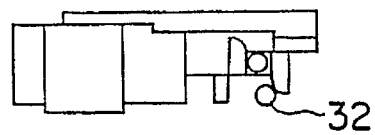
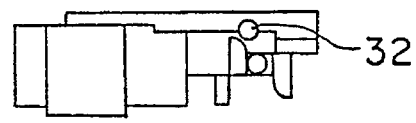
FIG. 23
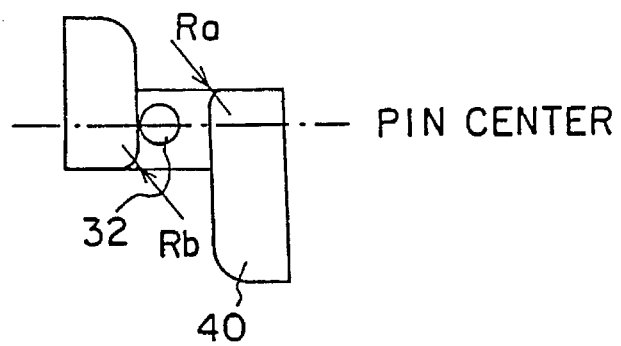
FIG. 24
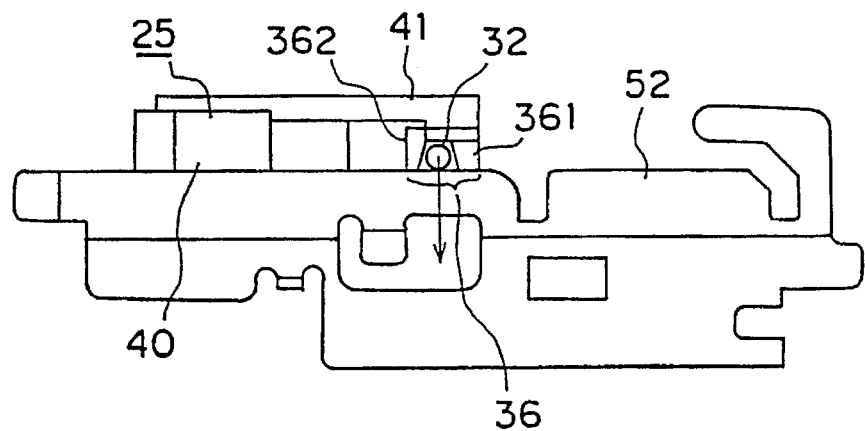

# CARTRIDGE CHANGING APPARATUS INCLUDING A PAIR OF BASE CARRIERS AND A PAIR OF SLIDE CARRIERS

BACKGROUND OF THE INVENTION

1. Field of the Invention

The present invention relates to a cartridge changing apparatus in use for a continuous play-back apparatus which contains a plurality of discs which are continuously played back.

2. Description of the Prior Art

FIG. 30 is a drawing showing the construction of a conventional automatic changing apparatus for exchanging a plurality of cartridges, disclosed in Japanese Utility Model Laid-Open No. 64-56055.

According to this utility model, a plurality of holders 1 are provided and a catcher 2 selectively grips one of them. Then, the selected holder 1 is extracted from a guide means and a loading arm 3 is operated to move the catcher 2 and the holder 1. After this, the cartridge is set on a tape running system.

FIG. 31 is a drawing for showing an example of part of a conventional cartridge changing apparatus for a plurality of cartridges. As shown in the same Figure, in the construction which enables selection of all cartridges at the insertion position, a guide 4 needs a space channel 6 in which a pin 5 of the holder 1 can be inserted above the uppermost stage and below the bottommost stage and, therefore, the guide 4 needs to be extended vertically by the amount required by the additional channel length. Therefore, the problem of this conventional cartridge changing apparatus is that it is difficult to reduce the size thereof.

Thus, such a construction wherein both the upper guide 7 and the lower guide 8 are divided to a cartridge insertion section and a cartridge play-back section while the cartridge insertion section and the cartridge play-back section are provided with channels the end of which are open as shown in FIG. 32 can be considered. However, the guides 7 and 8 of the play-back section need to be formed so as to be as small and thin as possible in order to secure vibration permissible distance between the cartridge play-back section and the other part, for example, an elevator. According to this design, this kind of the guide part cannot be produced from the viewpoint of the strength and precision, or otherwise the production cost thereof is increased.

Thus, a method wherein the lower guide 9 is mounted on a floating deck and the upper guide 10 is placed on the elevator 11 which is moved vertically can be considered, as shown in FIG. 33. Even when this construction is used, if reduction of the size of the mechanism is intended while a specified vibration permissible distance for the floating deck is secured, it is difficult to secure vibration permissible distance between the holder clamp member 12 and the holder pin 5. In these conventional cartridge changing apparatus, the carrier mechanisms are complicated. Thus, the construction attached to this mechanism becomes complicated, so that the number of required parts increases.

SUMMARY OF THE INVENTION

Accordingly, an object of the present invention is to solve the aforementioned problems and to provide a cartridge changing apparatus wherein the construction of a cartridge for carrying a cartridge is simplified and the carrier is not caught or damaged by other parts or vibrated.

Further, another object of the present invention is to provide a cartridge changing apparatus wherein the length of the cartridge changing apparatus is decreased by designing the carrier so as to be able to move, thereby leading to reduction of required space.

Still another object of the present invention is to provide a cartridge changing apparatus wherein a position in which a cartridge is extracted and located from the insertion position is a play-back position, so that the distance over which the cartridge is fed is reduced, thereby leading to reduction of the time required for replacement of the cartridge.

According to the present invention, there is provided a cartridge changing apparatus for replacing a cartridge containing a disc, the cartridge changing apparatus comprising a plurality of holders each holding a cartridge inserted therein, a plurality of pins fixed to respective holders, a loading motor which is a drive source for loading each cartridge held in each holder, a synchronizing shaft for transmitting a rotating force of the loading motor, a pair of screw shafts for further transmitting the rotating force transmitted from the synchronizing shaft, and a pair of base carriers each having a gripping portion for gripping a plurality of the pins on a holder and which are each engaged with the pair of the screw shafts and can be moved along the axis of each screw shaft as the pair of the screw shafts are rotated, and a pair of slide carriers which are combined with the pair of the base carriers and can be moved on the pair of the screw shafts together with the base carriers.

The operation of the cartridge changing apparatus according to the present invention will be described. The base carriers of the cartridge changing apparatus grip a plurality of pins fixed to any holder of a plurality of holders in which a cartridge containing a mini disc or the like is inserted and held each by means of the gripping portions and engage with the screw portions. As the screw shafts rotate, the base carriers are moved along the axes of the screw shafts. The slide carriers are combined with the base carriers and guided and moved by the screw shafts together with the base carriers. By this construction, the carriers composed of the slide carriers and base carrier are moved vertically at the cartridge insertion position to select a desired cartridge, and engaged with a holder to carry it. Because the carriers are moved horizontally or along the axes of the screw shafts, it is possible to secure stabilized horizontal movement of the carriers. Because the pins are held during the moving of the carriers, it is possible to secure stabilized motion of the carriers against vibration. Further, the pins of a holder are held securely by relative sliding motion between the base carrier and the slide carrier when the holder is carried.

Further, because it is possible to move both the base carriers and the slide carriers synchronously by means of both the screw shafts, no deflection occurs in a transverse direction relative to perpendicular to the moving direction of the carriers. Still further, because the pins of a holder can be kept so as to be unconstrained at the cartridge insertion position by the relative slide between the base carrier and the slide carrier, the carrier is capable of selecting an arbitrary cartridge by moving vertically without interfering with the pins.

According to a preferred embodiment of the present invention, the cartridge changing apparatus of the present invention comprises a motor fixed to a frame, a pair of step plates which are driven by the motor so as to be moved along the axes of the pair of the screw shafts and which have stair-like cam channels provided perpendicularly to a plane including the two axes of the pair of the screw shafts, and an elevator which is engaged with the stair-like cam channels of the pair of the step plates so as to be able to be moved vertically and which supports, at least, the loading motor, the synchronizing shaft, a pair of the screw shafts, a pair of the base carriers and a pair of the slide carriers.

Preferably, the cartridge changing apparatus of the present invention include a pair of springs each having one end thereof which is pressed against the base carrier and the other end thereof which is pressed against the slide carrier. Each of the pair of the screw shafts runs through each of the pair of the springs. Consequently, each of the springs can be incorporated inside a minimized space formed by the base carrier and the slide carrier, so that the inside space can be effectively used to contain each of the springs.

It is preferable that the inside diameter of the spring is set so as to be slightly larger than the outside diameter of the screw shaft so that the center of the spring substantially coincides with that of the screw shaft. As a result, the spring does not come into contact with the screw shaft so that no friction load is caused. Further, the construction of incorporated spring system can be simplified.

It is preferable that the winding direction of the screw of the screw shafts is set to be inverse to that of the springs. Thus, even if the spring comes into contact with the screw shaft, the spring is never caught by the screw of the screw shaft.

According to another preferred embodiment, each slide carrier is constructed so as to slide along the elevator in order to prevent the slide carrier from being turned in the direction of the rotation of the screw shaft which engages therewith. Further, the elevator is constructed so as to allow the slide carrier thereon in order to prevent the slide carrier from being turned in the direction of the rotation of the screw shaft. This eliminates the rattling of the slide carrier caused by the rotation of the carrier in the rotation direction of the screw shaft.

Preferably, each base carrier has a gripping portion having a tapered edge and each slide carrier is engaged with a corresponding base carrier and has a slide portion for covering the gripping portion of the base carrier. If a holder is slightly deflected from its proper position when an elevator moves vertically, it is possible to prevent the carriers from being caught and stopped by the holder.

The gripping portion of each base carrier may have a front gripping portion and a back gripping portion for gripping a pin of the holder along the advancement direction of the carrier. The front and back gripping portions may be tapered so as to press the pin in the gravity direction onto a guide on which the pin slides. Thus, the holder pin may be held at a specific position within the carrier during carrying of the holder in order to prevent the holder from rattling.

According to still another preferred embodiment, the cartridge changing apparatus of the present invention further includes a plurality of lock plates which are shaped like hooks for locking the pins of the plurality of holders, a plurality of slide plates rotatably supported by a plurality of the lock plates, a mechanism for driving each of a plurality of the slide plates independently to release each of a plurality of the lock plates and a plurality of springs for biasing each of a plurality of the lock plates in its locking direction.

Still further, preferably, the cartridge changing apparatus of the present invention includes a plurality of lock plates constructed such that the tip of each lock plate enters through a hole of each holder for locking each of the plurality of holders, a plurality of springs for biasing each of the plurality of lock plates, a holder catcher for holding the plurality of lock plates, an elevator which is movable in the vertical direction, and a mechanism mounted on the elevator, for driving each lock plate to release the tip of each lock plate from the holder hole engaging therewith. Yet still further, a driving mechanism, for example, a cam plate is provided on the elevator. Thus, no additional lock releasing member needs to be provided thereby contributing to the reduction of the number of required parts.

Further objects and effects of the present invention will be made evident in the following description of preferred embodiments drawn in the accompanying drawings.

BRIEF DESCRIPTION OF THE DRAWINGS

FIG. 4 is a plan view of the cartridge changing apparatus shown in FIG. 1 including a holder, an elevator and the like.

FIGS. 22a–22c are side views showing the carrier of the cartridge changing apparatus according to another embodiment of the present invention.

FIG. 23 is an enlarged view showing the gripping portion for a pin of the base carrier of the cartridge changing apparatus according to another embodiment of the present invention.

FIG. 24 is a side view showing the base carrier of the cartridge changing apparatus according to another embodiment of the present invention.

DETAILED DESCRIPTION OF THE PREFERRED EMBODIMENTS

Figure 1:
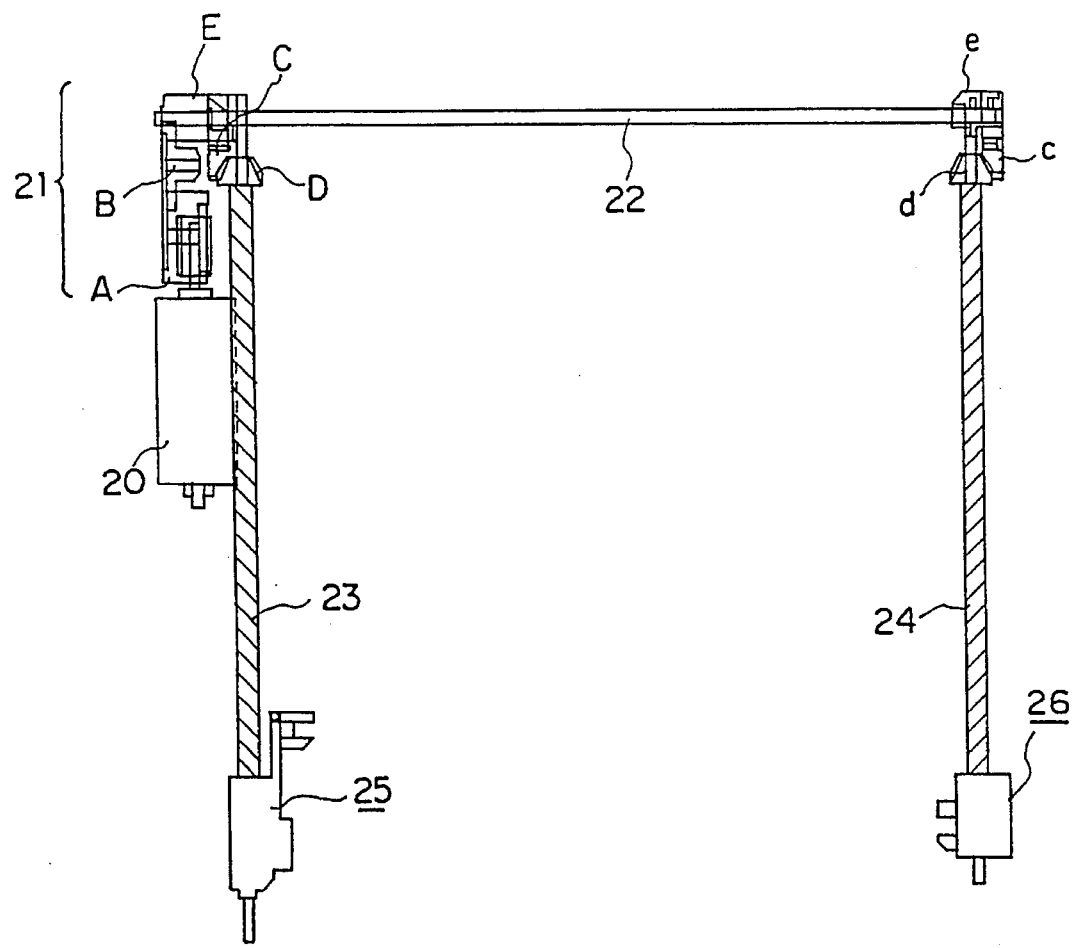
FIG. 1 is a plan view of the major parts of a cartridge changing apparatus according to an embodiment of the present invention.

FIG. 1 is a plan view of the major parts of a cartridge changing apparatus according to an embodiment of the present invention. Referring to FIG. 1, reference numeral 20 designates a loading motor, numeral 21 designates a speed reduction system of a series of gears, numeral 22 designates a synchronizing shaft for allocating the driving power of a loading motor 20 to the left and right sides in the figure. Numeral 23 designates a left screw shaft for transmitting the driving power allocated by the synchronizing shaft 22 and numeral 24 designates a right screw shaft. When the synchronizing shaft 22 is rotated, the screw shafts 23, 24 are rotated inversely to each other because the screw shaft 23 and the screw shaft 24 have the same gear construction and the reduction ratios of the screw shafts 23, 24 from the synchronizing shaft 22 are the same.

Figure 2:
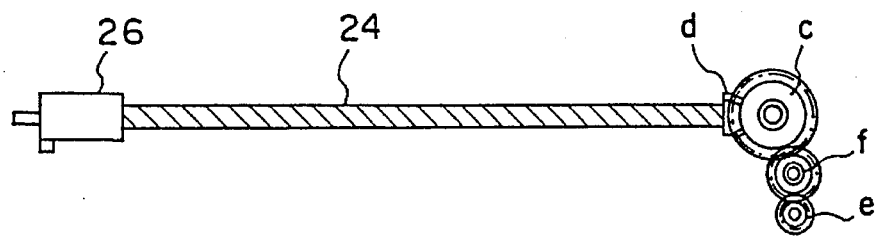
FIG. 2 is a right side view of the cartridge changing apparatus shown in FIG. 1.

Numeral 25 designates a left carrier which is engaged with the thread portion of the screw shaft 23 and can be moved back and forth by the rotation of the screw shaft 23. Numeral 26 designates a right carrier which is engaged with the thread portion of the screw shaft 24 and can be moved back and forth by the rotation of the screw shaft 24. FIG. 2 is a right side view taken from the side of the carrier 26, of the cartridge changing apparatus shown in FIG. 1. The rotating force is transmitted to the screw shaft 24 through a gear e fitted to the synchronizing shaft 22, a gear d fitted to the screw shaft 24, and gears c, f provided between the gears d and e.

Figure 3:
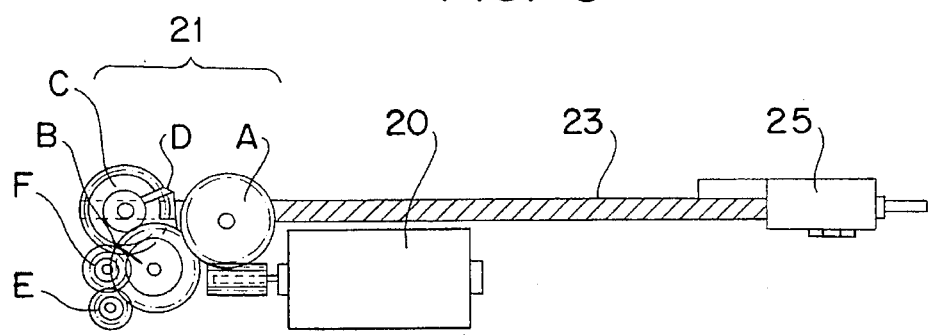
FIG. 3 is a left side view of the cartridge changing apparatus shown in FIG. 1.

FIG. 3 is a left side view taken from the side of the carrier 25, of the cartridge changing apparatus shown in FIG. 1. The rotation force from the loading motor 20 is transmitted to the screw shaft 23 through gears A, B, E, F, C and D. The synchronizing shaft 22 transmits the rotation force to the left and right sides in order to move the left carrier 25 and right carrier 26 back and forth, that is, in the longitudinal direction of the screw shafts synchronously.

Figure 4:
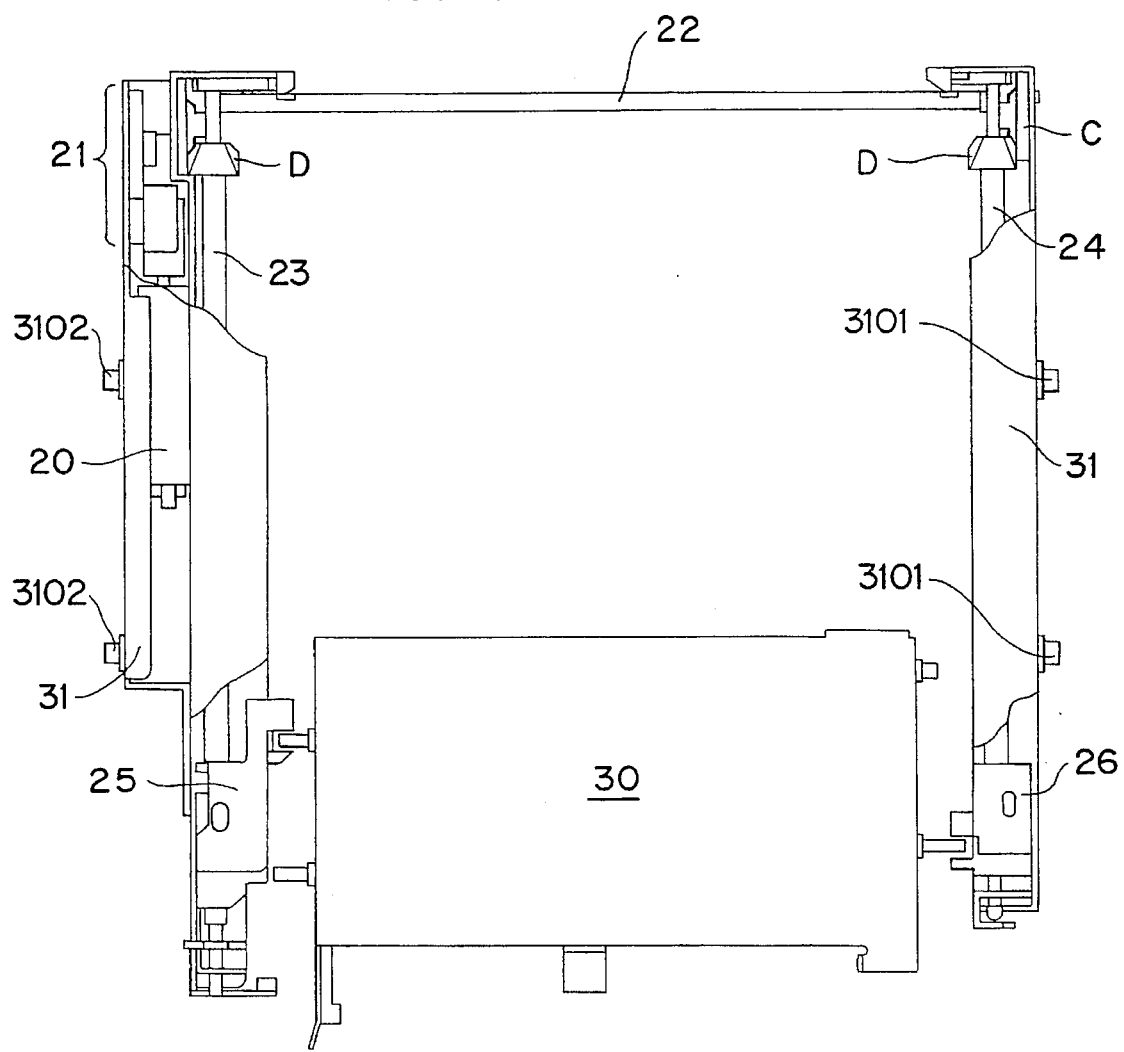
Figure 5:
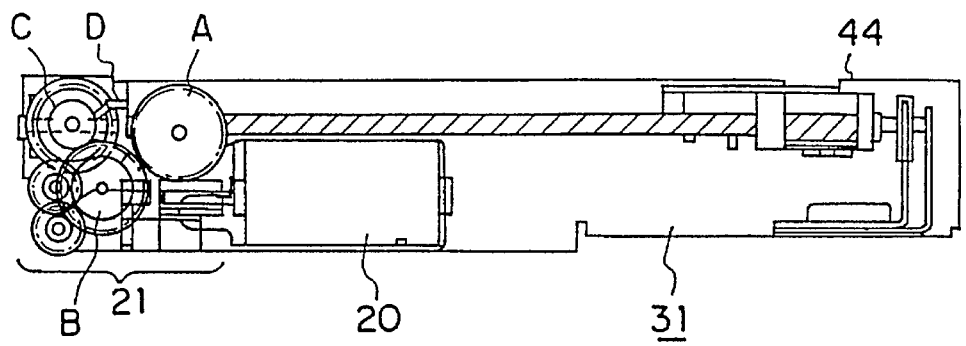
FIG. 5 is a left side view of the cartridge changing apparatus shown in FIG. 4.

FIGS. 4 and 5 show the condition in which a holder 30, an elevator 31, elevator pins 3101, 3102 and so on are attached to the cartridge changing apparatus shown in FIGS. 1, 2 and 3. Because components including the loading motor 20, the speed reduction system 21, the synchronizing shaft 22, the screw shafts 23, 24 and the carriers 25, 26 are attached to the elevator 31, these components can be moved up (in a direction toward the top of the page of FIG. 5) and down (in a direction toward the bottom of the page of FIG. 5) with the motion of the elevator 31.

Figure 6:
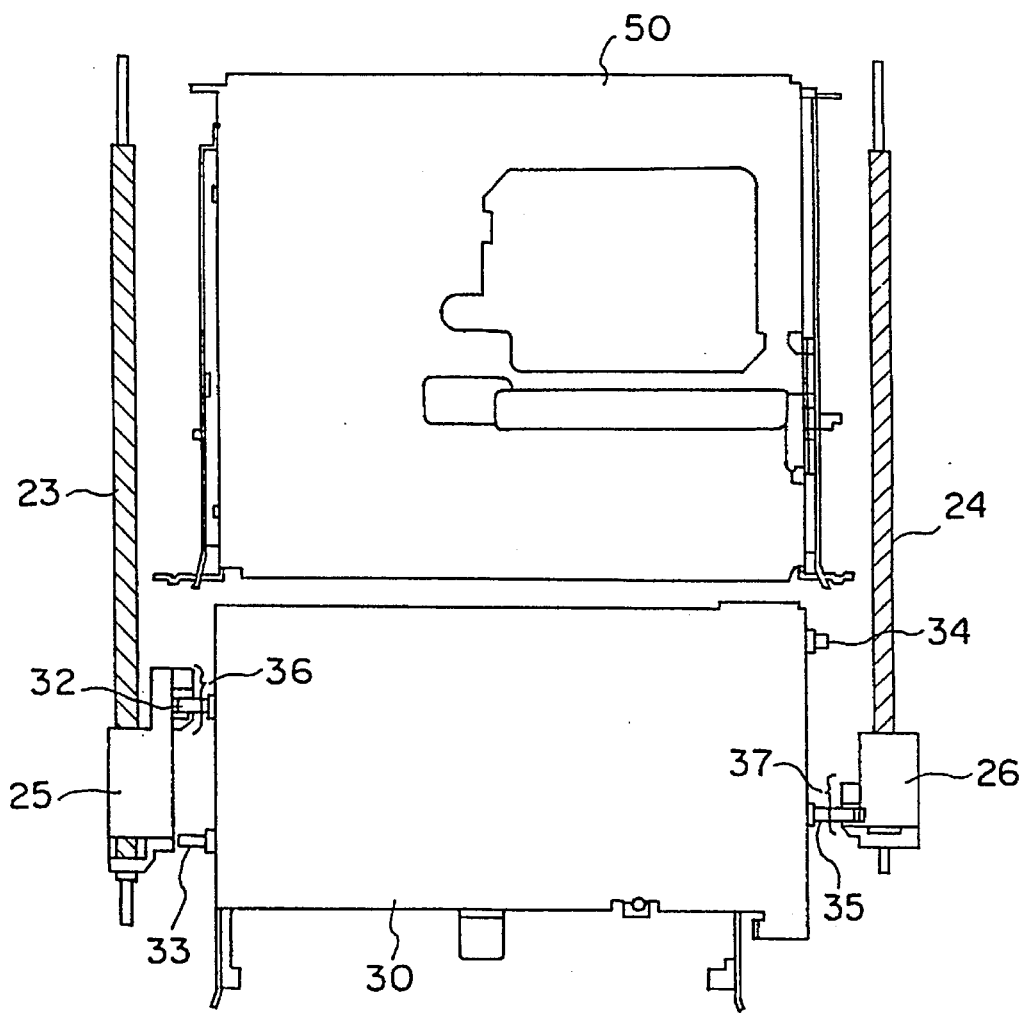
FIG. 6 is a plan view of the cartridge changing apparatus according to the present embodiment containing a cartridge inserted in a holder.
Figure 7:
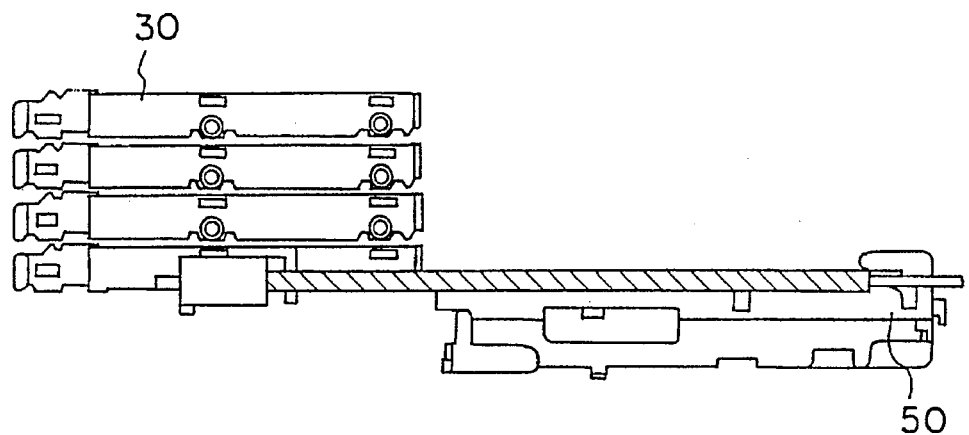
FIG. 7 is a right side view of the cartridge changing apparatus according to the present invention containing cartridges inserted in holders.
Figure 8:
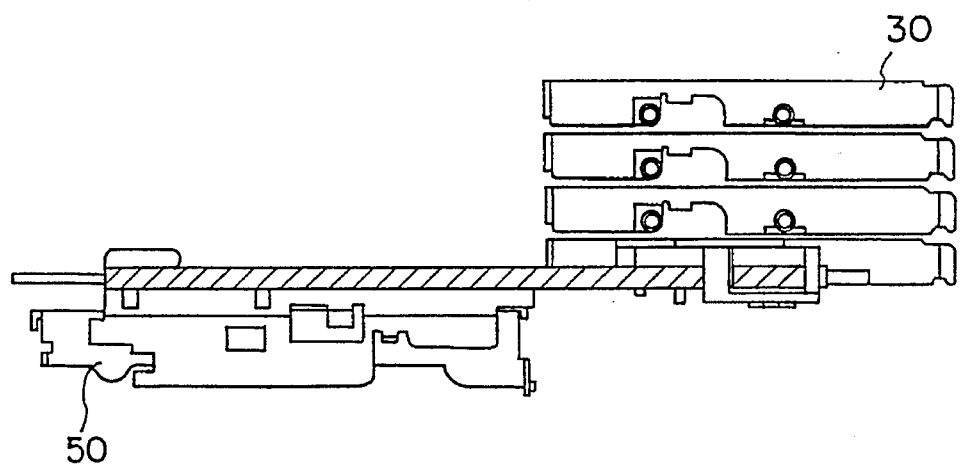
FIG. 8 is a left side view of the cartridge changing apparatus according to the present invention containing cartridges inserted in holders.
Figure 9:
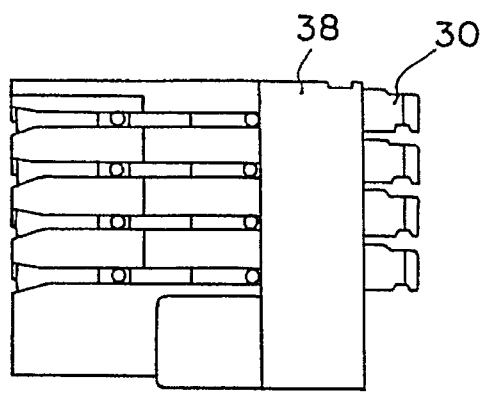
FIG. 9 is a left side view of the holder catcher of the cartridge changing apparatus according to the present invention containing cartridges inserted in holders.

FIGS. 6, 7 and 8, are a plan view, a right side view, a left side view of the cartridge changing apparatus holding the holders 30 in which a cartridge (not shown) is inserted each, and FIG. 9 is a view showing a holder catcher. The position in which a cartridge is to be inserted is called the "insertion position".

Figure 10:
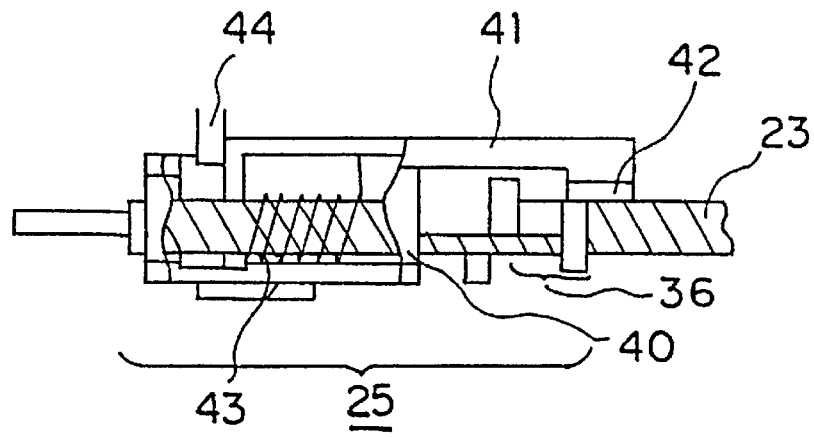
FIG. 10 is a side view showing the insertion position of the carrier of the cartridge changing apparatus according to the present invention.
Figure 11:
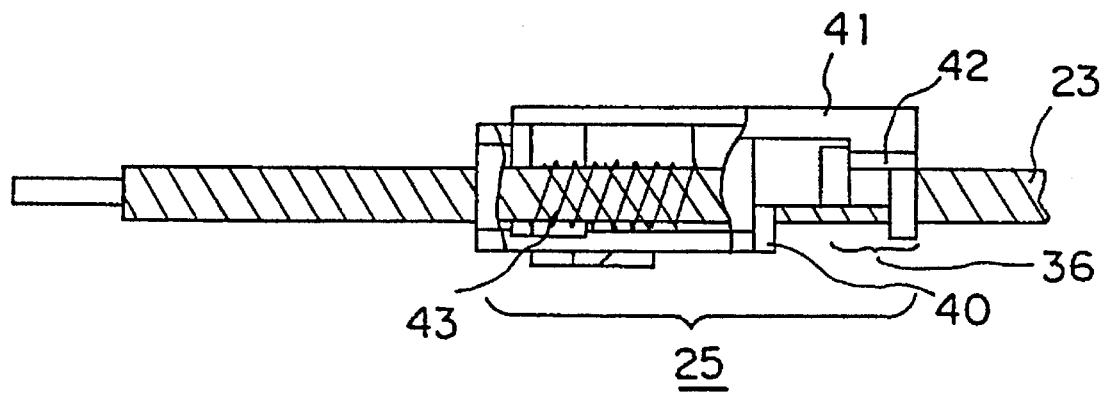
FIG. 11 is a side view showing the carrying position of the carrier of the cartridge changing apparatus according to the present invention.

Referring to FIG. 6, reference numerals 32, 33, 34, 35 designate pins fixed to the holder 30. The pin 32 is engaged with a holding portion 36 of the carrier 25 movably back and forth. The pin 35 is movably engaged with a holding portion 37 of the carrier 26. The holder 30 is engaged with a holder catcher 38 (see FIG. 9) fixed to a frame in order to restrain the holder 30 from moving along the width thereof. The holder 30 is blocked from moving downward in the vertical direction relative to the drawing surface of FIG. 6 and can move only upward in the vertical direction relative to the drawing surface of FIG. 6. FIGS. 10, 11 are side views showing the construction of the carrier 25 in details, located at the insertion position and carrying position, respectively, of the carrier 25 of the cartridge changing apparatus according to the present invention. Hereinafter, the condition in which the carrier is moved to carry the holder is referred to as the "carrying position" of the carrier 25.

Referring to the Figures mentioned above, numeral 40 designates a base carrier which is engaged with the thread portion of the screw shaft 23 so that the base carrier can be moved along the length of the screw shaft 23 and contains the holding portion 36. Numeral 41 designates a slide carrier which is combined with the base carrier 40 and can be moved together with the base carrier 40 along the guide of the screw shaft 23. Numeral 42 designates a lid portion of the slide carrier which slides to the holding portion 36 to cover an opening of the holding portion. Numeral 43 designates a spring, one end of which is pressed to the base carrier 40 and another end of which is pressed to the slide carrier 41 while the screw shaft 23 runs through the inside of the spring 43. Numeral 44 designates a stopper which contacts the slide carrier 41 at the insertion position, the stopper being provided on the bent portion of the elevator (not shown). The carrier 25 comprises the base carrier 40, the slide carrier 41 and the spring 43. The carrier 26 shown in FIG. 6 is also composed with the same construction as the carrier 25.

Figure 12:
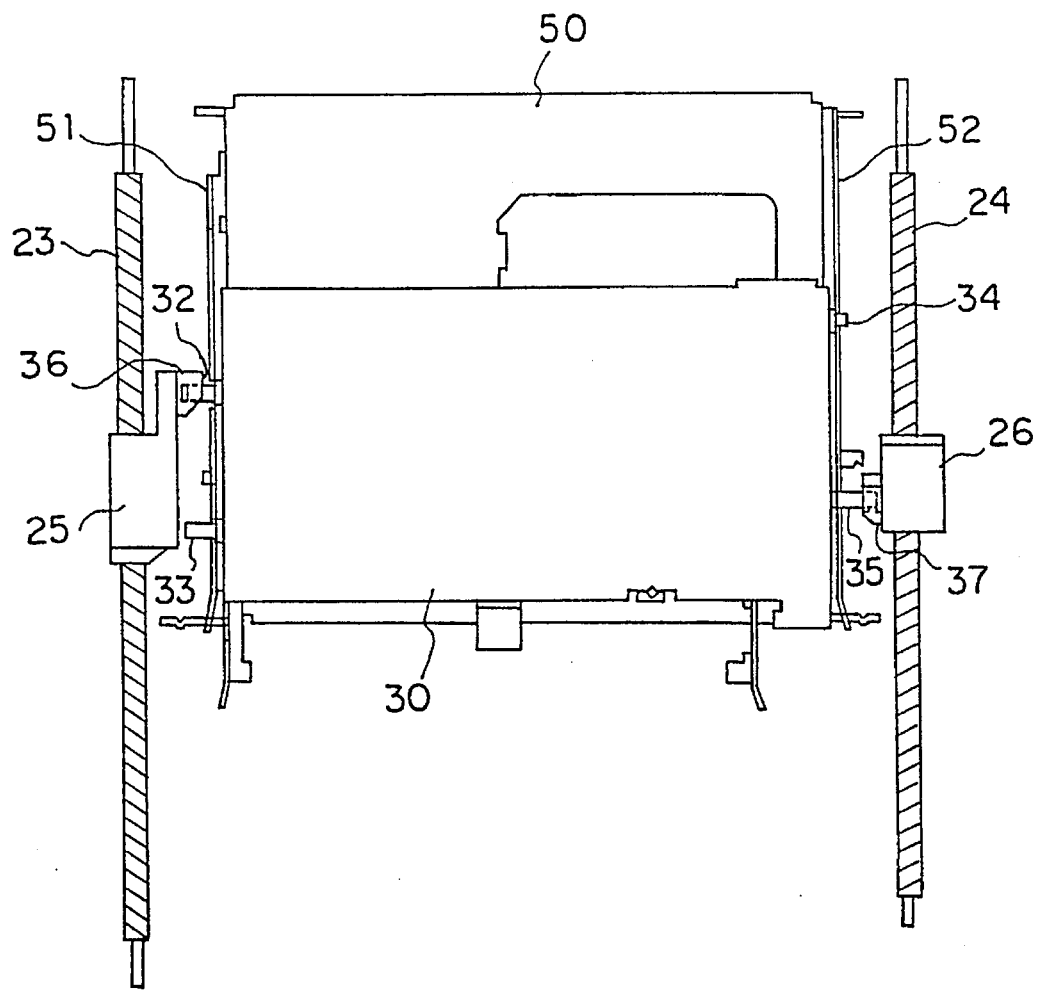
FIG. 12 is a plan view showing the carrying position of the carrier of the cartridge changing apparatus according to the present invention.
Figure 13:
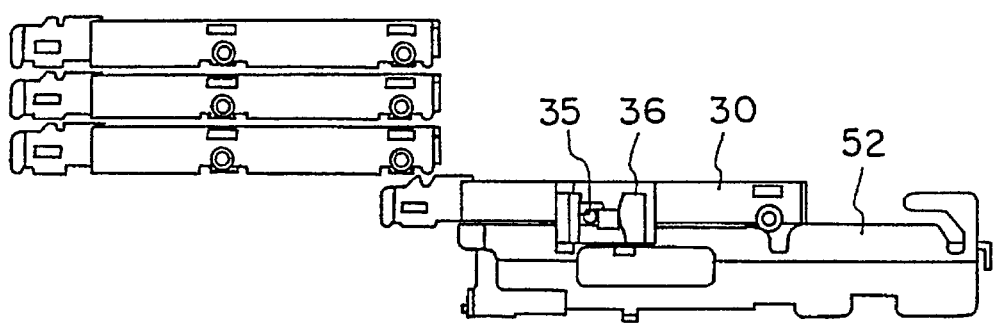
FIG. 13 is a right side view showing the carrying position of the carrier of the cartridge changing apparatus according to the present invention.
Figure 14:
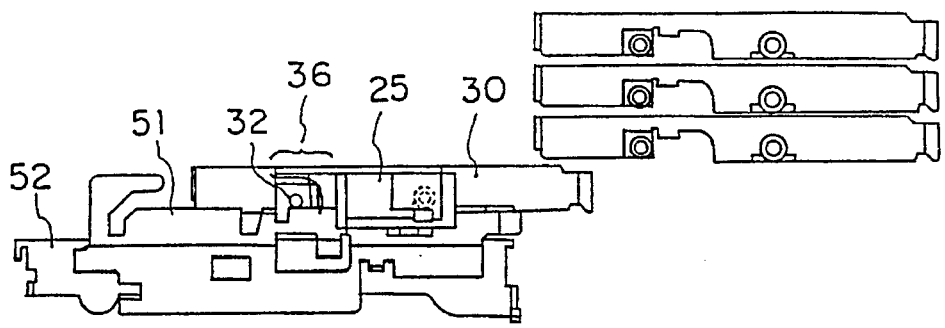
FIG. 14 is a left side view showing the carrying position of the carrier of the cartridge changing apparatus according to the present invention.

FIGS. 12, 13 and 14 are a plan view, a right side view and a left side view, respectively, showing the condition of the carrier located at the carrying position, of the cartridge changing apparatus of the present invention. Numeral 50 designates a floating deck, numeral 51 designates a left guide plate fixed to the floating deck 50, and numeral 52 designates a right guide plate fixed to the floating deck 50. In the cartridge changing apparatus constructed in the above-mentioned manner, the motion of the carrier 25, 26 in the vertical direction (or perpendicular) or in such a direction in which a plurality of the holders are stacked will be described.

Figure 15:
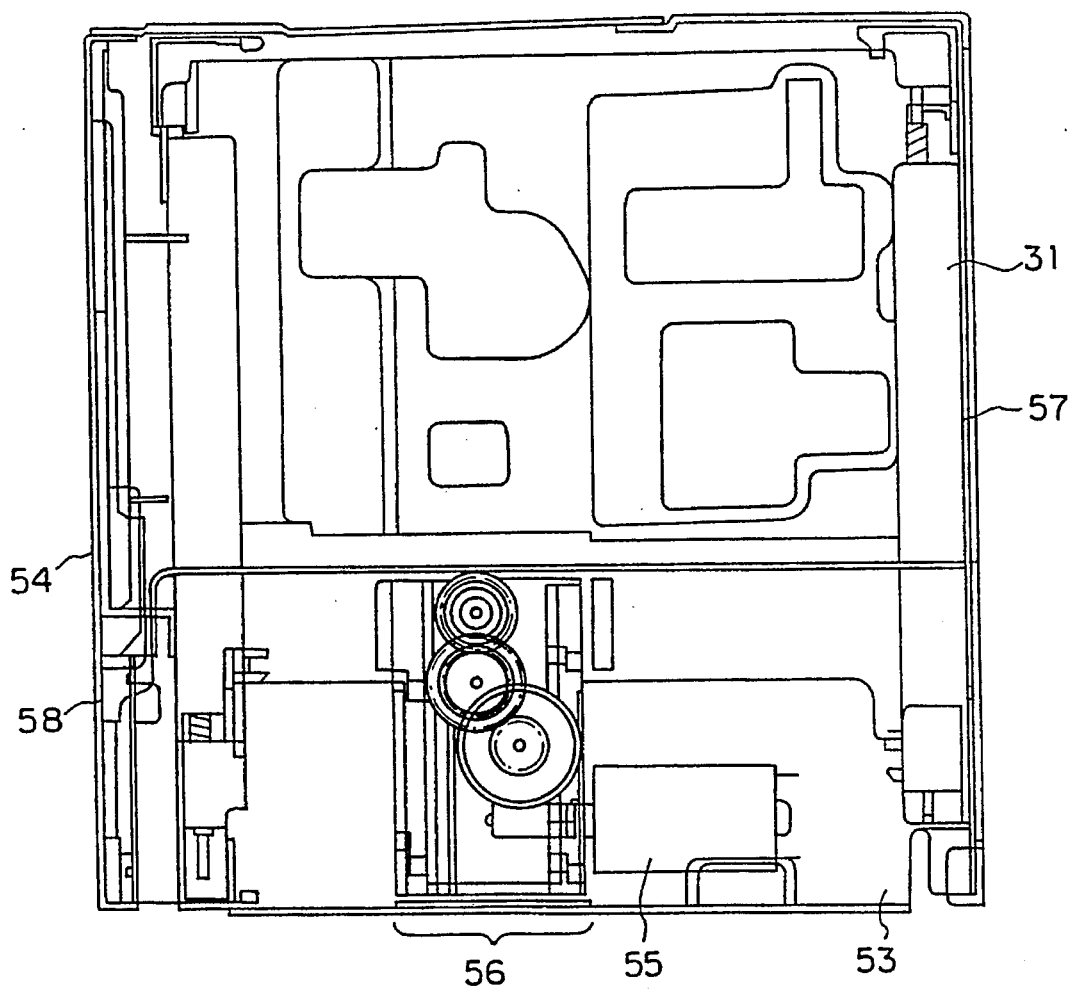
FIG. 15 is plan view showing the elevator of the cartridge changing apparatus according to the present embodiment.
Figure 16:
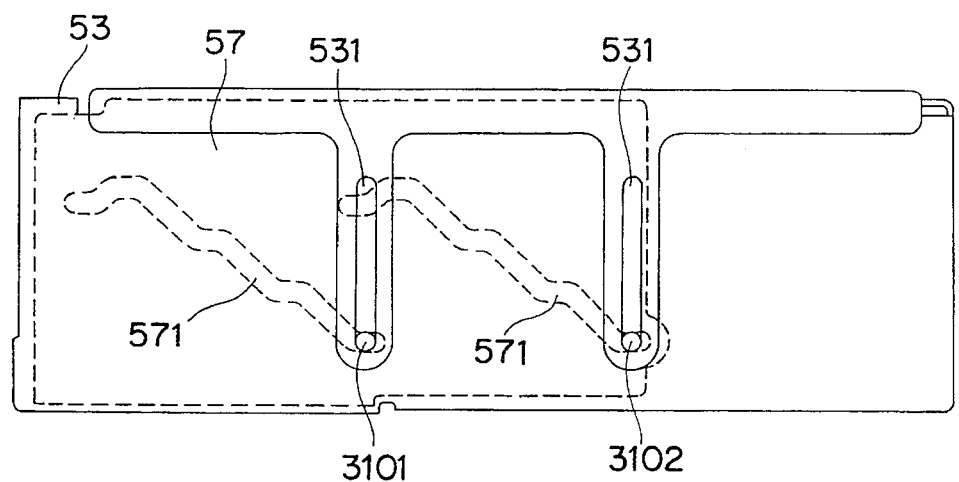
FIG. 16 is right side view showing the elevator of the cartridge changing apparatus according to the present embodiment.
Figure 17:
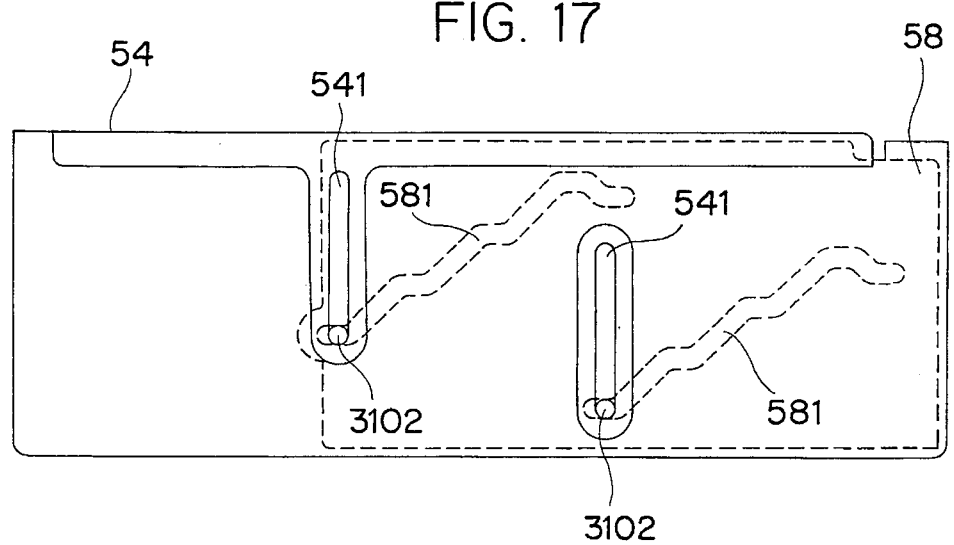
FIG. 17 is left side view showing the elevator of the cartridge changing apparatus according to the present embodiment.
Figure 18:
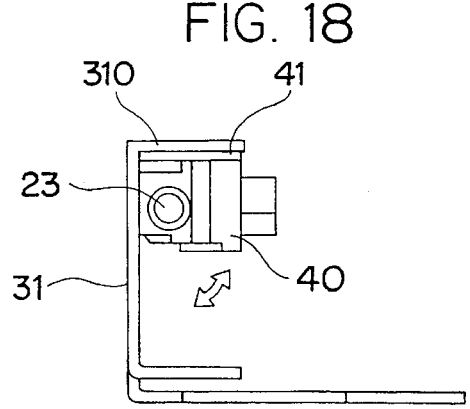
FIG. 18 is a side view showing the carrier of the cartridge changing apparatus according to another embodiment of the present invention.

FIGS. 15, 16 and 17 are a plan view, a right side view and a left side view showing the construction of the cartridge changing apparatus according to the present embodiment. Numeral 53 designates a frame of a case for composing the right side, the bottom and the rear side. Numeral 54 designates a frame of a case for forming the left side. Numeral 55 designates a motor fixed to this frame. Numeral 56 designates a series of gears for speed reduction. Numeral 57 designates a step plate which is driven by means of the motor so as to be moved back and forth. Numeral 58 designates a step plate, whose bottom portion is connected to the step plate 57, movable according to movement of the step plate 57. Numeral 571 designates stair-like cam channel provided within the step plate 57. Numeral 572 designates stair-like cam channel provided within the step plate 58. The form of the stair-like cam channel 571 is the same as the form of the stair-like cam channel 581. Numeral 531 is a guiding groove provided within the frame 53. Numeral 541 is a guiding groove provided within the frame 54. Numeral 31 designates an elevator having elevator pins 3101, 3102. Each pin 3101 is inserted to each cam channel 571 and each groove 531, and movable on each cam channel 571. Each pin 3102 is inserted to each cam channel 581 and each groove 541, and movable on each cam channel 581. In FIGS. 16 and 17, the elevator 31 is not shown. Basically, vertical movement of the carriers enables to select any cartridge from a plurality of cartridges at the cartridge insertion position. During the carrying of a cartridge back and forth, the cartridge is held by the carriers. That is, the carriers are moved vertically at the insertion position and then are engaged with a desired holder in order to carry its cartridge.

Referring to FIGS. 15, 16 and 17, if the motor 55 is rotated, the series of gears 56 for speed reduction are driven to change the motor rotation speed, so that the step plates 57 and 58 are moved in the back and forth direction. Since the pins 3101 and 3102 can be guided in only a vertical direction by the grooves 531 and 541, they can not move in the back and forth direction though the stair-like cam channels 571 and 581 move in the back and forth direction according to movement of the plates 57 and 58. Thus, the elevator pins 3101 and 3102 move in only a vertical direction when the plates 57 and 58 move in the back and forth direction, since the shapes of the stair-like cam channels 571 and 581 are the same. As a result, the elevator can move in vertical direction without inclination.

Next, the movement of the carriers 25 and 26 will be described. Referring to FIG. 1, when the loading motor 20 is rotated, the rotation thereof is transmitted to the synchronizing shaft 22 from the speed reduction system 21 to rotate the screw shaft 23 thereby moving the carrier 25. At the same time, the screw shaft 24 is also rotated in order to move the carrier 26.

When the carriers 25 and 26 are located at the cartridge insertion position, as shown in FIG. 10, the slide carrier 41 contacts the stopper 44 so that the lid portion 42 slides away from the gripping portion 36. Thus, the pin 32 of the holder 30 can be kept in the gripping portion 36 such that the pin 32 is unconstrained. Thus, the carrier 25 may be moved perpendicularly to this drawing of FIG. 6. Because the carrier 26 can also keep the pin 35 and the gripping portion 37 such that the pin 35 is free from the gripping portion 37. Thus, the carrier 26 can be moved perpendicularly to the drawing.

When the carriers are located at the cartridge carrying position, the carrier 25 pulls the pin 32 of the holder 30 shown in FIG. 6 by means of the gripping portion 36 which is closed by the force of the spring 43 shown in FIGS. 10 and 11, so that the holder 30 is moved along the axis of the screw shaft 23. As for the motion in a direction perpendicular to the drawing, the lid portion 42 covers the gripping portion 36 by means of the force of the spring 43 in order to guide the pin 32 by means of the lid portion 42 thereby preventing the pin 32 of the holder 30 shown in FIG. 6 from jumping out. Also, the carrier 26 operates in the same manner as the carrier 25.

Because the carriers which are carrying parts are moved vertically at the insertion position and are capable of holding a cartridge during the carrying of the cartridge as explained above, it is not necessary to provide each stage with the gripping function of the carrier, so that the number of required parts can be reduced and the carriers can be moved up or down immediately at the aforementioned position in which unloading is completed. Further, it is possible to prevent the pins 32 and 35 from jumping out of the carriers 25 and 26 due to vibration, shock or the like.

In the aforementioned construction, it is necessary to solve such problems as generation of abnormal noise, reduction of vibration resistance and reduction of driving force and further, a problem that a holder may get loose because the holder is likely to be twisted, and other problems.

Namely, because the base carrier of the carrier is moved resisting the rotation direction of the screw shaft, a force trying to turn the base carrier is generated. Thus, it is necessary to move the base carrier 40 smoothly without being vibrated by preventing the rotation of the base carrier by means of a guide provided on the elevator. Further, it is also necessary to prevent the screw shaft from being slackened more than required if the base carrier is twisted during the carrying of the carrier. Still further, it is necessary to prevent the base carrier from being vibrated alone when vibration is applied to the set by engaging the base carrier with the elevator in order to improve the vibration resistance thereof.

FIGS. 18, 19, 20 and 21 are side views showing the slide carrier of the carriers. In the slide carrier shown in FIG. 18, the bent portion 310 on which the slide carrier 41 is slidable is provided on the elevator 31 in order to prevent the base carrier 40 and the slide carrier 41 from being turned with respect to a rotation in the arrow direction by the rotation force of the screw shaft 23.

Figure 19:
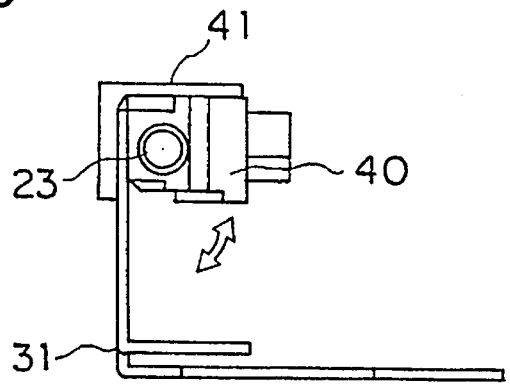
FIG. 19 is a side view showing the carrier of the cartridge changing apparatus according to still another embodiment of the present invention.

In FIG. 19, the elevator 31 is placed between the slide carrier 41 and the screw shaft 23 to resist the rotation force in the arrow direction. This construction is also capable of preventing the rotation of the base carrier 40 and the slide carrier 41.

Figure 20:
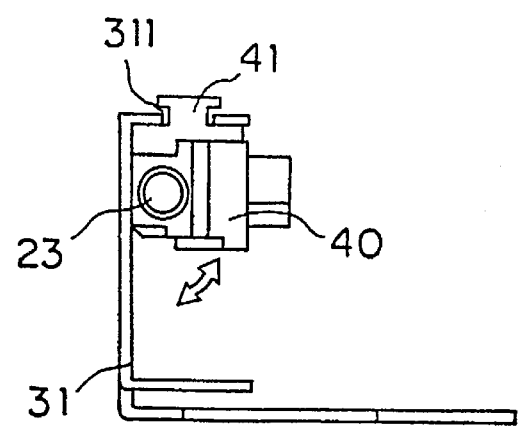
FIG. 20 is a side view showing the carrier of the cartridge changing apparatus according to further embodiment of the present invention.

In FIG. 20, a long hole 311 is provided on the plane of the elevator 31 on which the slide carrier 41 is slidable in order to guide the slide carrier 41 having a protrusion which can slide on the upper surface of the upper side of the elevator 31 along the long hole 311.

Figure 21:
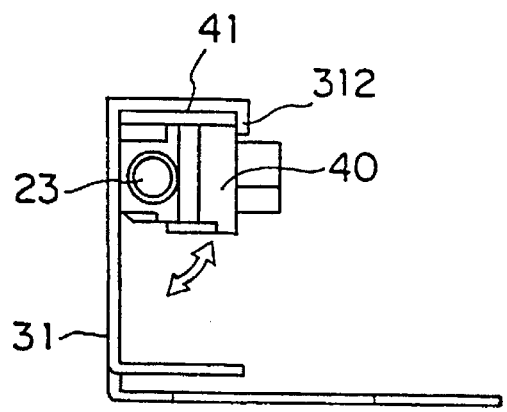
FIG. 21 is a side view showing the carrier of the cartridge changing apparatus according to still further embodiment of the present invention.

In FIG. 21, the slide portion 312 of the elevator 31 is bent in the U-shaped form in order to guide the side of the base carrier 40 also thereby reducing the looseness of the carrier.

Referring to FIGS. 10 and 11, the spring 43 is a compression coil spring. By setting the internal diameter of the spring 43 so as to be slightly larger than the external diameter of the screw shaft 23, the spring 43 can move along the length of the screw shaft 23. By equalizing the external diameter of the spring 43 with the internal dimension of the base carrier 40, it is possible to align the center of the spring 43 with that of the screw shaft 23. Further, by inverting the winding direction of the threads of the screw shaft 23 relative to the winding direction of the spring 43, it is possible to avoid deformation of the spring which may occur if the spring 43 comes into contact with the screw shaft 23 and an increase of load applied when the base carrier 40 is carried, and it is possible to prevent the base carrier 40 from being hooked by the screw shaft 23. Still further, by inverting the winding direction of the threads of the screw shaft 23 relative to that of the spring 43, it is possible to prevent the spring 43 from being caught, so that the allowances of the dimensions of the screw shaft 23 and the spring 43 can be decreased as compared with the case in which the thread direction of the screw shaft 23 is the same as that of the spring 43. Thus, inverting the thread direction of the screw shaft 23 relative to that of the spring 43 contributes to reduction of the size of the apparatus.

Even if a holder held at the insertion position is protruded to some extent in the carrying direction so that it is deflected from its proper position, the holder must be moved vertically without being hooked by the carriers so that the holder is carried properly. FIGS. 22 and 23 show examples of the modification of the base carrier according to the aforementioned first embodiment. Referring to FIGS. 22a–22c and 23, numeral 40 designates a base carrier having the gripping portion for the holder pin and numeral 41 designates a slide carrier which is engaged with the base carrier 40 and which has a slide portion for covering the gripping portion of the base carrier 40. FIG. 22a shows the condition in which the pin 32 of the holder is held at the correct position. FIG. 22b shows the condition in which the base carrier 40 and the slide carrier 41 are about to be moved downward. The pin 32 is moved in the arrow direction by the round corner of the gripping portion. FIGS. 22c shows the condition in which the base carrier 40 and the slide carrier 41 are about to be moved upward. The pin 32 is moved in the arrow direction by the round corner of the gripping portion of the base carrier 40.

In order to prevent upward or downward urging force from being applied to the pin 32 when the gripping portion of the base carrier 40 moves the pin 32 in the carrying direction, the center line of the pin 32 is designed not so as to overlap the round corners Ra and Rb shown in FIG. 23. The same treatment is made to the pin 35 also.

Because the carrier shown in FIGS. 22a–22c have the aforementioned construction, tapering or chamfering the end face of the gripping portion for the holder pin of the carrier makes it possible to correct the pin position, that is, holder position by means of the round or slant corner of the gripping portion even if the pin is deflected to some extent, so that the carrier can be moved vertically without being caught by the holder pin. Consequently, it is possible to avoid the locking of the carrier to carry the holder properly.

Figure 25:
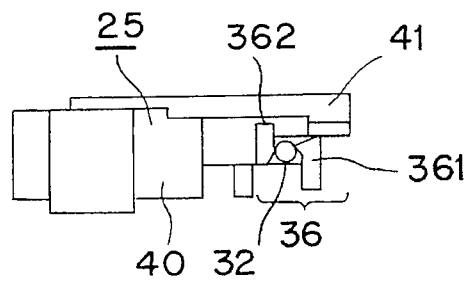
FIG. 25 is a side view showing the base carrier of the cartridge changing apparatus according to another embodiment of the present invention.

It is necessary to eliminate the upward/downward and left/right looseness of the holder which occurs during the carrying of the pin. FIGS. 24 and 25 are side views of the base carrier of the cartridge changing apparatus according to another embodiment of the present invention. In the same Figure, numeral 40 designates a base carrier having the gripping portion for the holder pin 32. Numeral 41 designates a slide carrier which slides over the gripping portion for the holder pin 32 in order to cover the gripping portion. Numeral 32 designates a pin fixed to the holder. Numeral 52 designates a guide plate for allowing the pin to slide when the pin is being carried.

In the carrier system having the aforementioned construction, the gripping portion 362 provided backward relative to the advancement direction of the carrier 25 has a taper slanting to the right, and the gripping portion 361 provided forward relative to the advancement direction of the carrier has a taper slanting to the left. Therefore, the gripping portions 362 and 361 apply a force pressing the pin 32 against the guide plate 52 when a holder is loaded or unloaded. As described above, referring to FIGS. 24 and 25, because the base carrier 40 has the gripping portion 362 which is located backward relative to the advancement direction of the carrier and slants to the right, and the gripping portion 361 which is located forward relative to the advancement direction of the carrier and slants to the left, a force pressing the pin 32 against the guide plate 52 is generated when the holder is loaded or unloaded.

Thus, a vertical load is applied to the holder thereby preventing the looseness of the holder from being caused. Further, by providing the holder pin contacting portion of the gripping portion of the carrier with an inclination, the holder is urged upward or downward. Thus, it is possible to prevent the holder from being loosened due to friction with other parts during the carrying of the holder.

Figure 26:
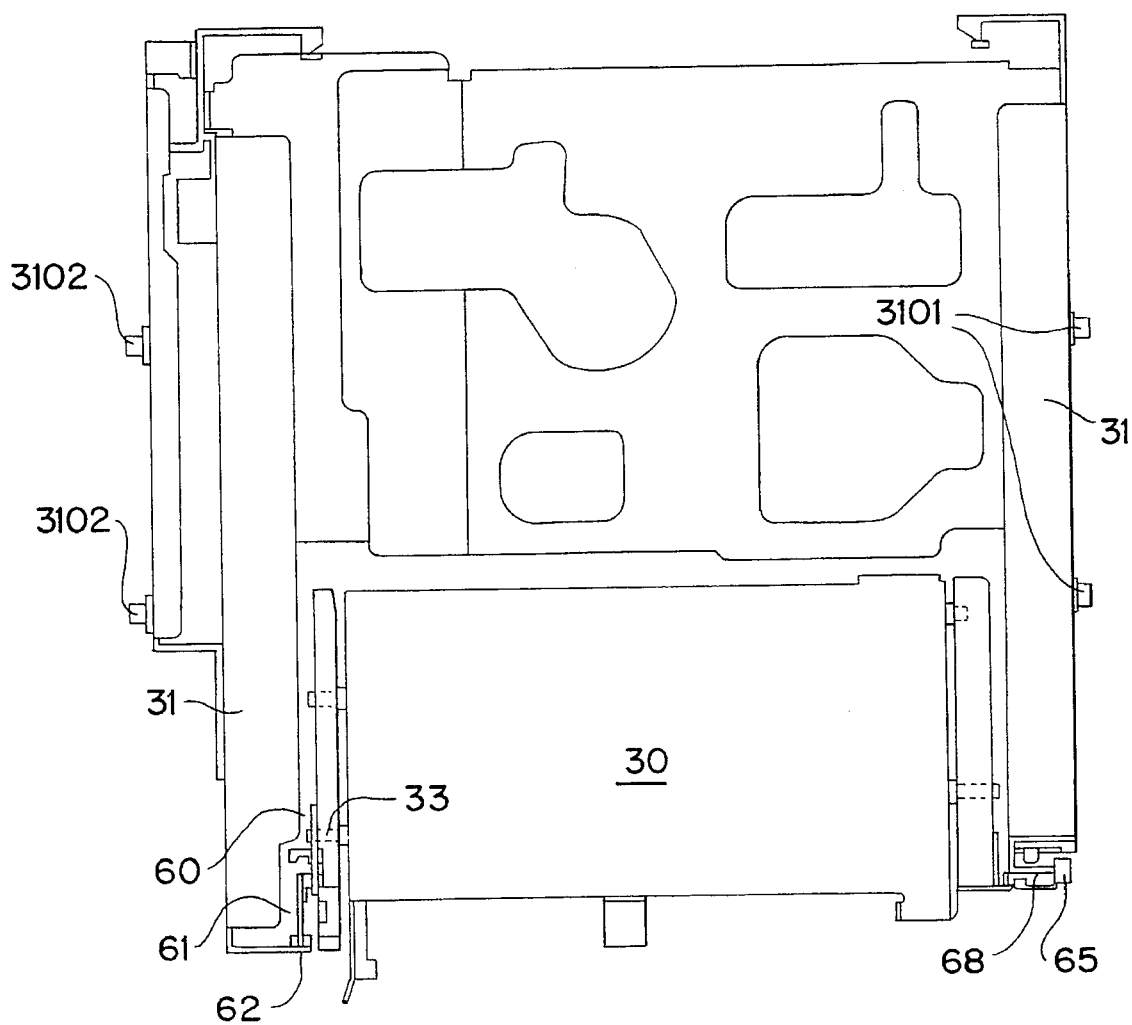
FIG. 26 is a plan view showing the locking system of the cartridge changing apparatus according to an embodiment of the present invention.
Figure 27:
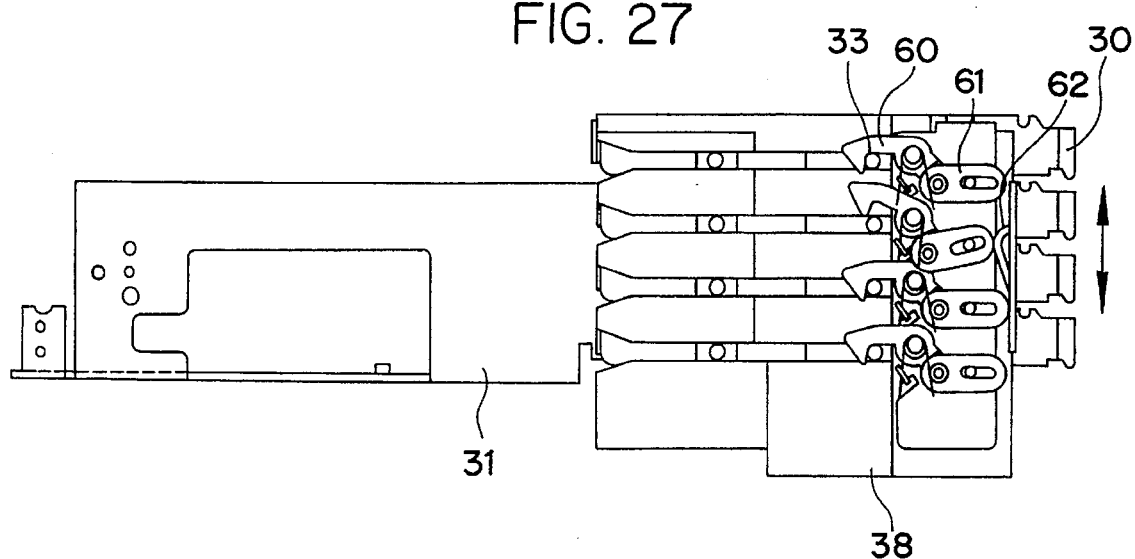
FIG. 27 is a left side view showing the locking system shown in FIG. 26.

FIGS. 26 and 27 are a plan view and a side view for explaining the lock system of the holder of the cartridge changing apparatus. Referring to these Figures, numeral 33 designates a pin fixed to the holder 30. Numeral 60 designates a lock plate for locking the pin 33. Numeral 61 designates a slide plate caulked with the lock plate 60. Numeral 62 designates the cam plate for pressing the slide face 61 which is formed on the elevator 31. Numeral 63 designates a spring for biasing the lock plate 60 counterclockwise.

In this construction, the slide plate 61 is biased by means of the spring 63 to the right in FIG. 27 (forward in FIG. 26). To release the lock of the holder 30, the elevator 31 is moved in a direction indicated by the arrow so that the cam plate 62 is moved to the position of a selected cartridge. When the cam plate 62 comes into contact with the slide plate 61, the slide plate 61 is pushed to the inner side, so that the lock plate 60 is turned clockwise to release the locking between the pin 33 and the lock plate 60.

Consequently, the holder 30 can carry a cartridge freely. If another cartridge is selected, the holder 30 is retracted to its carrying position. At this time, the lock plate 60 remains in contact with the cam plate 62. Thus, the lock plate 60 is kept so as to be turned to the right. Therefore, it is possible to return the holder 30 to the insertion position. Next, the cam plate 62 is moved vertically. Then, the slide plate 61 is moved to the right by means of the spring, so that the lock plate 60 is rotated counterclockwise in order to lock the pin 32.

Figure 28:
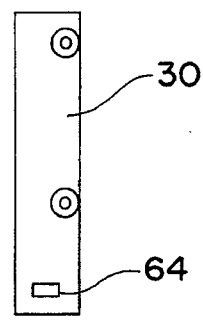
FIG. 28 is a right side view showing a holder of the cartridge changing apparatus according to an embodiment of the present invention.
Figure 29:
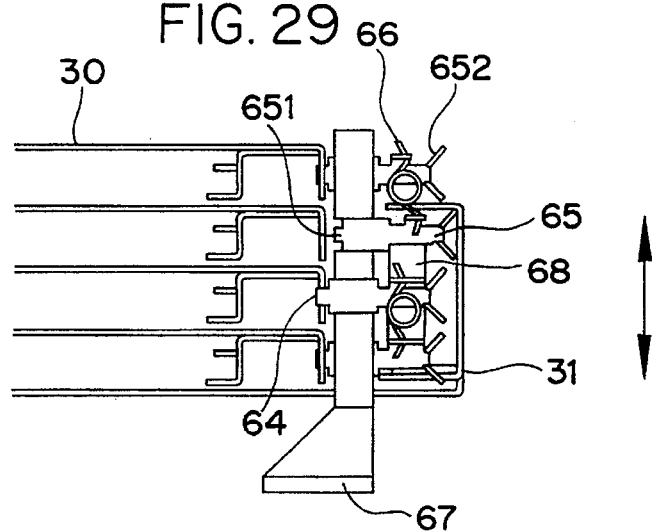
FIG. 29 is a front view showing the locking system of the cartridge changing apparatus according to another embodiment of the present invention.
Figure 30:
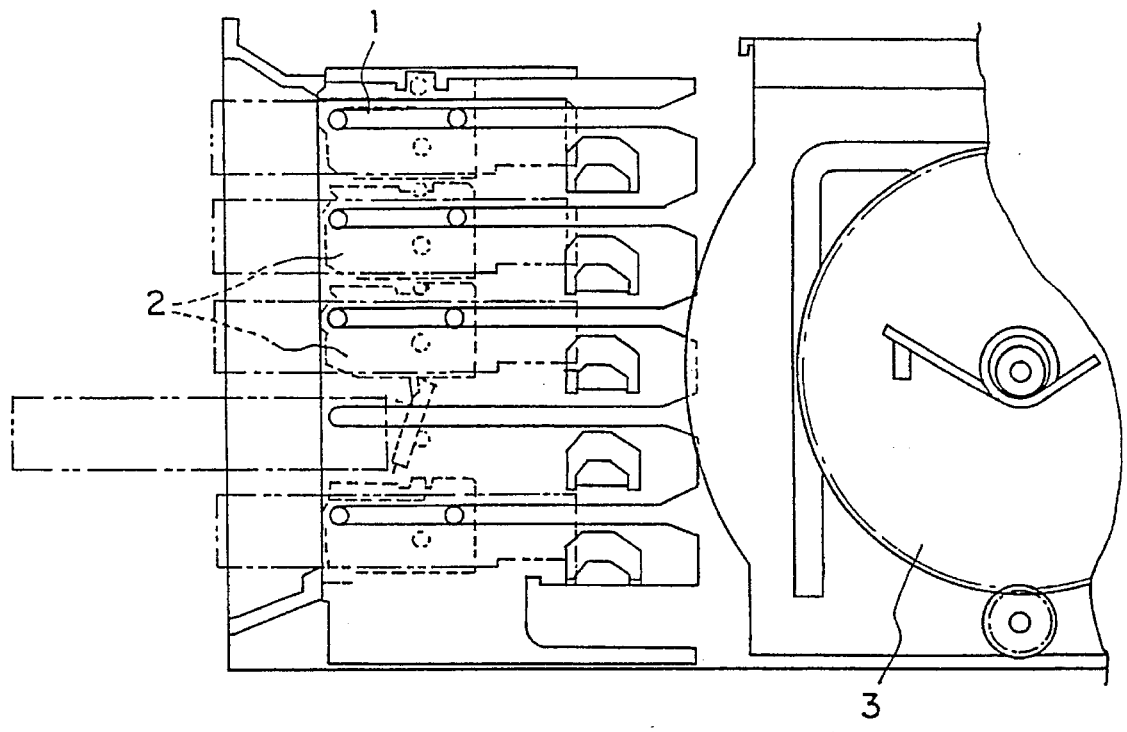
FIG. 30 is a side view showing the floating deck of a conventional cartridge changing apparatus.
Figure 31:
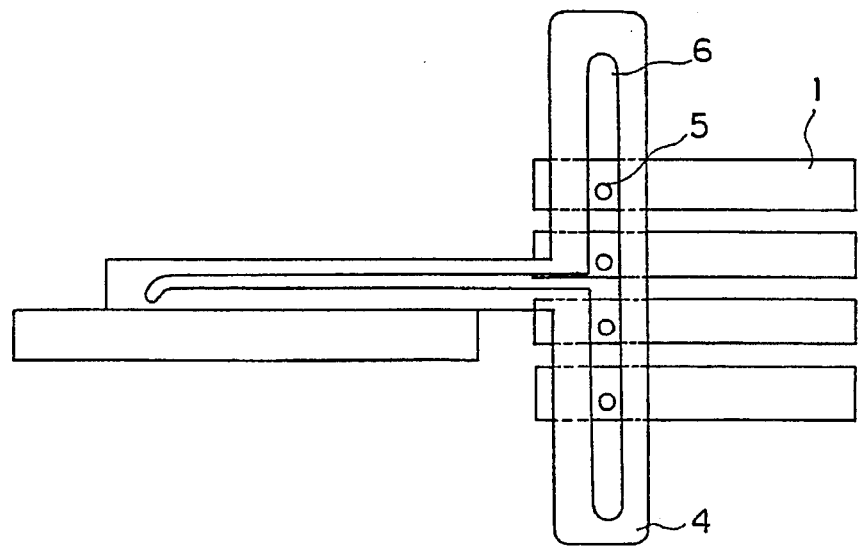
FIG. 31 is a side view of another example of conventional floating deck.
Figure 32:
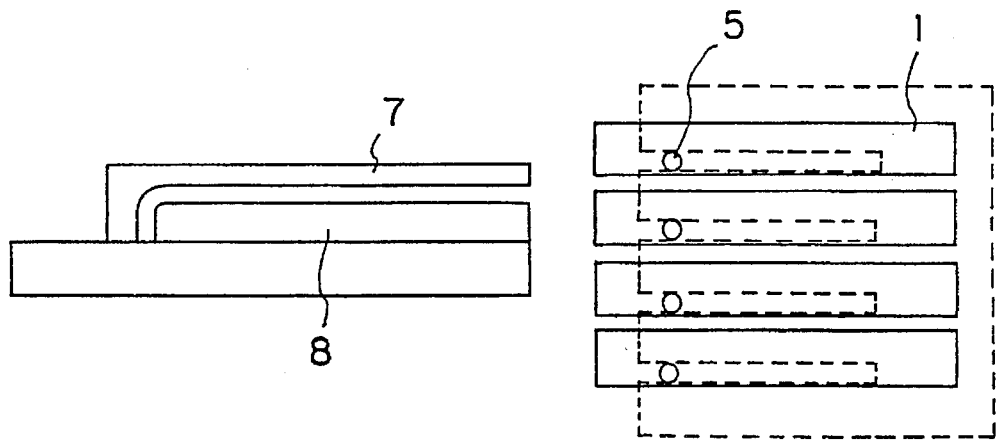
FIG. 32 is a side view of still another example of conventional floating deck.
Figure 33:
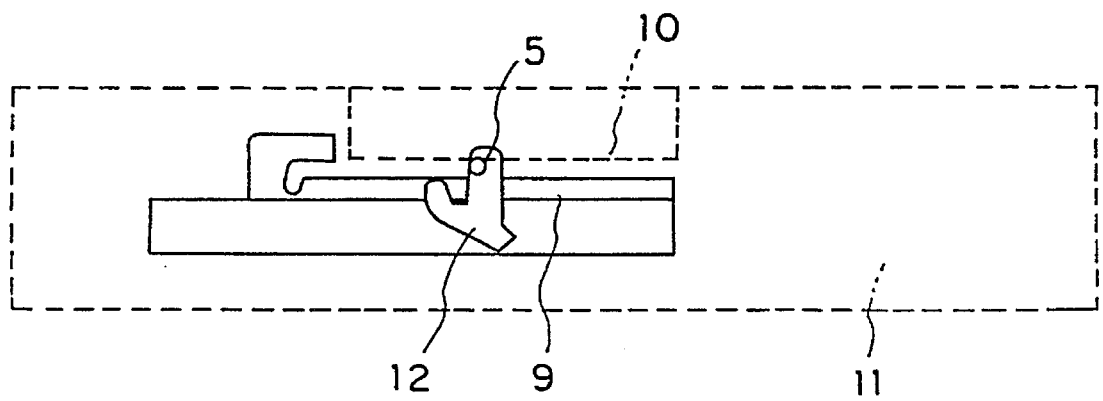
FIG. 33 is a side view of further example of conventional floating deck.

FIGS. 28 and 29 are a side view of a holder according to other example of the locking system and a front view of the locking system, respectively. In these Figures, numeral 64 designates a hole provided in the holder 30. Numeral 65 designates a lock plate for locking the holder 30 by placing the end of the lock plate 65 through the hole 64. Numeral 66 designates a spring for biasing the lock plate 65 such that the end 651 of the lock plate 65 enters the hole 64. Numeral 67 designates a holder catcher for holding the lock plate 65. Numeral 68 designates a lock releasing cam fixed to the elevator 31.

In this construction, to release the locking of the holder 30, the elevator 31 is moved in a direction indicated by the arrow so that the lock releasing cam 68 is moved to the position of a selected cartridge. Consequently, the lock releasing cam 68 contacts with the inclined plate 652 and draws out the lock plate 65 such that the end 651 is extracted from the hole 64. As a result, the end 651 of the lock plate 65 is removed out of the hole 64 so as to release the locking. To lock the holder, the elevator 31 is moved in a direction indicated by the arrow so that the lock releasing cam 68 is released from the lock plate 65. Consequently, the lock plate 65 moves in front of the hole 64 by force of the spring 66 and then, the end 651 of the lock plate 65 runs through the hole 64 so that the holder 30 is locked.

As evident from what is mentioned above, the present invention provides the following advantages. According to the present invention, it is not necessary to provide a plurality of the gripping functions for the carrier and the number of parts which must be attached to the carrier can be reduced.

Because the carrier is moved vertically at the cartridge insertion position to select a desired cartridge and then the holder pins are gripped before the holder is moved, it is possible to secure and carry the holder.

Further, because both the screw shafts make it possible to move the base carriers and slide carriers so that the respective base carriers and slide carriers operate synchronously with each other, no deflection occurs between the carriers on the left and right screw shafts.

Still further, because the carrier can be kept so as to hold no holder pin when the holder is located at the cartridge insertion position, the carrier is capable of moving vertically to select an arbitrary cartridge. Still further, because the carrier can be moved vertically without interfering with the holder pin or being hooked by the holder pin, it is possible to prevent an occurrence of the looseness of the holder.

Still further, because rattling of the carrier due to its rotation is prevented and rattling of the holder due to its taper are prevented, it is possible to prevent the pin from being loosened due to vibration or shock.

Still further, because each spring is incorporated inside each carrier, the size of the carrier can be reduced to simplify the construction.

Still further, because the cam plate is mounted on the elevator, it is not necessary to provide additionally a lock releasing member, and holders other than a holder located at the carrying position can be locked, and the number of required parts can be reduced.

Different embodiments of the present invention in a wide range can be formed without departing from the spirit and scope of the present invention. The present invention is not restricted to any specific embodiment except the embodiments specified in the attached claims.

What is claimed is:

1. A cartridge changing apparatus for replacing a cartridge containing a disc, said cartridge changing apparatus comprising:

a plurality of holders, each holding a cartridge inserted therein;

a plurality of pins fixed to said plurality of holders;

a loading motor, loading any cartridge held in any of said plurality of holders;

a synchronizing shaft, transmitting a rotating force of said loading motor;

a pair of screw shafts, further transmitting the rotating force transmitted from said synchronizing shaft;

a pair of base carriers, each having a gripping portion for gripping one of said plurality of pins on a holder and each engaged with one of said pair of screw shafts, said pair of base carriers being moved along axes of said pair of screw shafts as said pair of screw shafts are rotated; and a pair of slide carriers which are combined with said pair of base carriers and are moved on said pair of screw shafts together with said base carriers, each of said pair of slide carriers restricting a vertical movement of one of said plurality of pins gripped within the gripping portion of a corresponding one of said pair of base carriers in cooperation with the corresponding one of said pair of base carriers while one of said holder is carried.

2. The cartridge changing apparatus of claim 1, further comprising:

holder locking means for locking said plurality of holders at insertion positions where said plurality of holders are inserted into said apparatus, respectively, and for releasing one of said plurality of holders when carried by said pairs of base and slide carriers, said holder locking means comprising:

a plurality of lock plates of hook shape, for locking the plurality of pins of said plurality of holders;

a plurality of slide plates rotatably supported by said plurality of lock plates;

means for driving each of said plurality of slide plates independently to release each of said plurality of lock plates; and a plurality of springs, each for biasing one of said plurality of lock plates in a locking direction.

3. The cartridge changing apparatus of claim 1, further comprising:

holder locking means for locking said plurality of holders at insertion positions where said plurality of holders are inserted into said apparatus, respectively, and for releasing one of said plurality of holders when carried by said pairs of base and slide carriers, said holder locking means comprising:

a plurality of lock plates, constructed such that a tip of each of the plurality of lock plates enters a hole of one of the plurality of holders to lock each of said plurality of holders;

a plurality of springs, biasing each of said plurality of lock plates;

a holder catcher, holding said plurality of lock plates;

an elevator, movable in a vertical direction; and means, mounted on said elevator, for driving each of the plurality of lock plates to release the tip of each of the plurality of lock plates from the hole engaging therewith.

4. The cartridge changing apparatus of claim 1, further comprising:

a motor fixed to a frame, a pair of step plates which are driven by said motor so as to be moved along the axes of said pair of screw shafts and which have stair-like cam channels provided perpendicular to a plane including the axes of said pair of screw shafts; and an elevator which is engaged with the stair-like cam channels of said pair of the step plates so as to be moved in a direction perpendicular to the plane and which supports, at least, said loading motor, said synchronizing shaft, said pair of screw shafts, said pair of base carriers and said pair of slide carriers.

5. The cartridge changing apparatus of claim 4, further comprising:

holder locking means for locking said plurality of holders at insertion positions where said plurality of holders are inserted into said apparatus, respectively, and for releasing one of said plurality of holders when carried by said pairs of base and slide carriers, said holder locking means comprising:

a plurality of lock plates, constructed such that a tip of each of the plurality of lock plates enters a hole of one of the plurality of holders to lock each of said plurality of holders;

a plurality of springs, biasing each of said plurality of lock plates;

a holder catcher, holding said plurality of lock plates;

an elevator, movable in a vertical direction; and means, mounted on said elevator, for driving each of the plurality of lock plates to release the tip of each of the plurality of lock plates from the hold engaging therewith.

6. The cartridge changing apparatus of claim 4, further comprising:

holder locking means for locking said plurality of holders at insertion positions where said plurality of holders are inserted into said apparatus, respectively, and for releasing one of said plurality of holders when carried by said pairs of base and slide carriers, said holder locking means comprising:

a plurality of lock plates of hook shape, for locking the plurality of pins of said plurality of holders;

a plurality of slide plates rotatably supported by said plurality of lock plates;

means for driving each of said plurality of slide plates independently to release each of said plurality of lock plates; and a plurality of springs, each for biasing one of said plurality of lock plates in a locking direction.

7. The cartridge changing apparatus of claim 4, wherein each of said pair of slide carriers is constructed so as to slide along said elevator in order to prevent each of said pair of slide carriers from being turned in a direction of rotation of each of the pair of screw shafts engaged therewith.

8. The cartridge changing apparatus of claim 4, wherein each of said pair of slide carriers includes a slide portion for covering an upper part of the gripping portion of a corresponding one of said pair of base carriers so as to restrict a vertical upward movement of one of said plurality of pins while said pair of slide carriers carries one of said plurality of holders.

9. The cartridge changing apparatus of claim 8, wherein the gripping portion of each of said pair of base carriers has a tapered edge, and wherein each of said pair of slide carriers is engaged with a corresponding one of said pair of base carriers so that the slide portion of each of said pair of slide carrier partially covers the gripping portion of each of said pair of base carriers so as to restrict a vertical upward movement of one of said plurality of pins located within the gripping portion.

10. The cartridge changing apparatus of claim 1, further comprising:

a guide plate for restricting a vertical downward movement of one of said plurality of pins, gripped within the gripping portion of each of said pair of base carriers in cooperation with each of said pair of slide carriers, and for guiding one of said plurality of pins.

11. The cartridge changing apparatus of claim 10, wherein the gripping portion of each of said pair of base carriers has a front gripping portion and a back gripping portion for gripping a pin of one of said plurality of holders along an advancement direction of each of said pair of base carriers, said front and back gripping portions being tapered so as to press the pin of one of said plurality of holders in a downward direction onto said guide plate on which the pin of one of said plurality of holders slides.

12. The cartridge changing apparatus of claim 1, wherein each corresponding pair of slide and base carriers includes urging means for causing the corresponding slide and base carriers to attract each other when carrying one of said plurality of holders.

13. The cartridge changing apparatus of claim 12, wherein said urging means is a spring having one end pressed against a corresponding one of said pair of base carriers and the other end pressed against a corresponding one of said pair of slide carriers, and wherein a corresponding one of said pair of screw shafts runs through said spring.

14. The cartridge changing apparatus of claim 13, wherein an inside diameter of each of said pair of springs is set so as to be slightly larger than an outside diameter of each of the pair of screw shafts so that centers of said pair of springs substantially coincide with centers of said pair of screw shafts, respectively.

15. The cartridge changing apparatus of claim 13, wherein a threading direction of a screw of each pair of screw shafts is opposite of a winding direction of a corresponding one of the pair of springs.

16. The cartridge changing apparatus of claim 1, wherein each of said pair of slide carriers includes a slide portion for covering an upper part of the gripping portion of a corresponding one of said pair of base carriers so as to restrict a vertical upward movement of one of said plurality of pins while said pair of slide carriers carries one of said plurality of holders.

17. The cartridge changing apparatus of claim 16, wherein the gripping portion of each of said pair of base carriers has a tapered edge, and wherein each of said pair of slide carriers is engaged with a corresponding one of said pair of base carriers so that the slide portion of each of said pair of slide carriers partially covers the gripping portion of each of said pair of base carriers so as to restrict a vertical upward movement of one of said plurality of pins located within the gripping portion.

* * * * *